(12) United States Patent
Lindoff

(10) Patent No.: US 7,020,070 B2
(45) Date of Patent: Mar. 28, 2006

(54) SELECTIVELY CONTROLLED MODULATION DISTORTION OF AN IQ-BASEBAND SIGNAL

(75) Inventor: Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 671 days.

(21) Appl. No.: 09/828,897

(22) Filed: Apr. 10, 2001

(65) Prior Publication Data

US 2003/0012289 A1   Jan. 16, 2003

(51) Int. Cl.
*H04J 11/00* (2006.01)
(52) U.S. Cl. .................. 370/206; 370/342; 375/296
(58) Field of Classification Search ........ 370/203–215; 375/297, 298, 296, 262, 261; 455/110, 93, 455/126; 332/123, 103
See application file for complete search history.

(56) References Cited

U.S. PATENT DOCUMENTS

| | | | |
|---|---|---|---|
| 4,268,802 A | 5/1981 | Fisher et al. | |
| 4,565,980 A | 1/1986 | Ashida | |
| 4,584,541 A | 4/1986 | Nossen | |
| 4,696,017 A | 9/1987 | Masheff et al. | |
| 4,700,151 A | 10/1987 | Nagata | |
| 5,091,919 A | 2/1992 | Kuisma | |
| 5,121,077 A | 6/1992 | McGann | |
| 5,123,031 A | 6/1992 | Kuisma | |
| 5,363,408 A * | 11/1994 | Paik et al. ................ | 375/261 |
| 5,384,810 A * | 1/1995 | Amrany ................... | 375/340 |
| 5,450,044 A | 9/1995 | Hulick | |
| 5,499,389 A | 3/1996 | Victorin | |
| 5,506,546 A | 4/1996 | Kowaguchi | |
| 5,548,838 A * | 8/1996 | Talwar et al. ............. | 455/304 |
| 5,604,770 A * | 2/1997 | Fetz ......................... | 375/296 |
| 5,748,678 A | 5/1998 | Valentine et al. | |
| 5,764,692 A | 6/1998 | Mucke | |
| 5,787,362 A | 7/1998 | Matero | |
| 5,838,728 A * | 11/1998 | Alamouti et al. .......... | 375/265 |
| 5,867,537 A * | 2/1999 | Dent ......................... | 375/298 |
| 5,894,496 A * | 4/1999 | Jones ........................ | 455/126 |
| 5,900,778 A | 5/1999 | Stonick et al. | |
| 6,047,168 A * | 4/2000 | Carlsson et al. ........... | 455/126 |
| 6,052,404 A * | 4/2000 | Tiepermann ............... | 375/145 |
| 6,101,224 A | 8/2000 | Lindoff et al. | |
| 6,130,916 A | 10/2000 | Thomson | |
| 6,137,826 A | 10/2000 | Boesch | |
| 6,160,855 A * | 12/2000 | Nakamura et al. ......... | 375/280 |
| 6,266,517 B1 * | 7/2001 | Fitzpatrick et al. ...... | 455/114.3 |

(Continued)

FOREIGN PATENT DOCUMENTS

GB     2337670     11/1999

*Primary Examiner*—Chau Nguyen
*Assistant Examiner*—Ian N. Moore
(74) *Attorney, Agent, or Firm*—Potomac Patent Group PLLC

(57) ABSTRACT

The frequency bandwidth of a signal is reduced, while retaining the desired signal information, by selectively introducing a controlled distortion to an IQ baseband signal. Selective generation of either a non-distorted complex-valued baseband signal or a distorted complex-valued baseband signal may be based upon values of information bits in the sequence of information bits to be represented by the radio frequency signal. The technique is applicable to both IQ-modulators and polar modulators, thereby allowing cost-efficient and current-efficient polar modulators and/or cost-efficient power amplifiers to be utilized.

26 Claims, 11 Drawing Sheets

U.S. PATENT DOCUMENTS

| | | | |
|---|---|---|---|
| 6,400,233 B1 * | 6/2002 | Thomas | 332/103 |
| 6,421,398 B1 * | 7/2002 | McVey | 375/308 |
| 6,441,694 B1 * | 8/2002 | Turcotte et al. | 332/100 |
| 6,597,751 B1 * | 7/2003 | Cutler | 375/348 |
| 6,697,436 B1 * | 2/2004 | Wright et al. | 375/296 |
| 2003/0147655 A1 * | 8/2003 | Shattil | 398/182 |

* cited by examiner

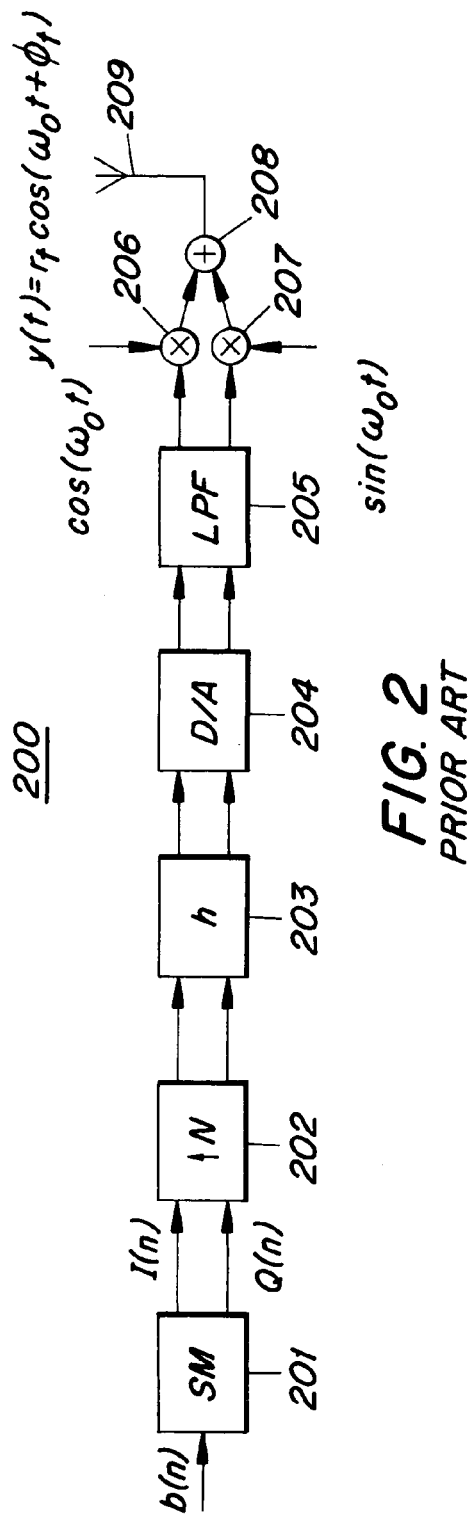
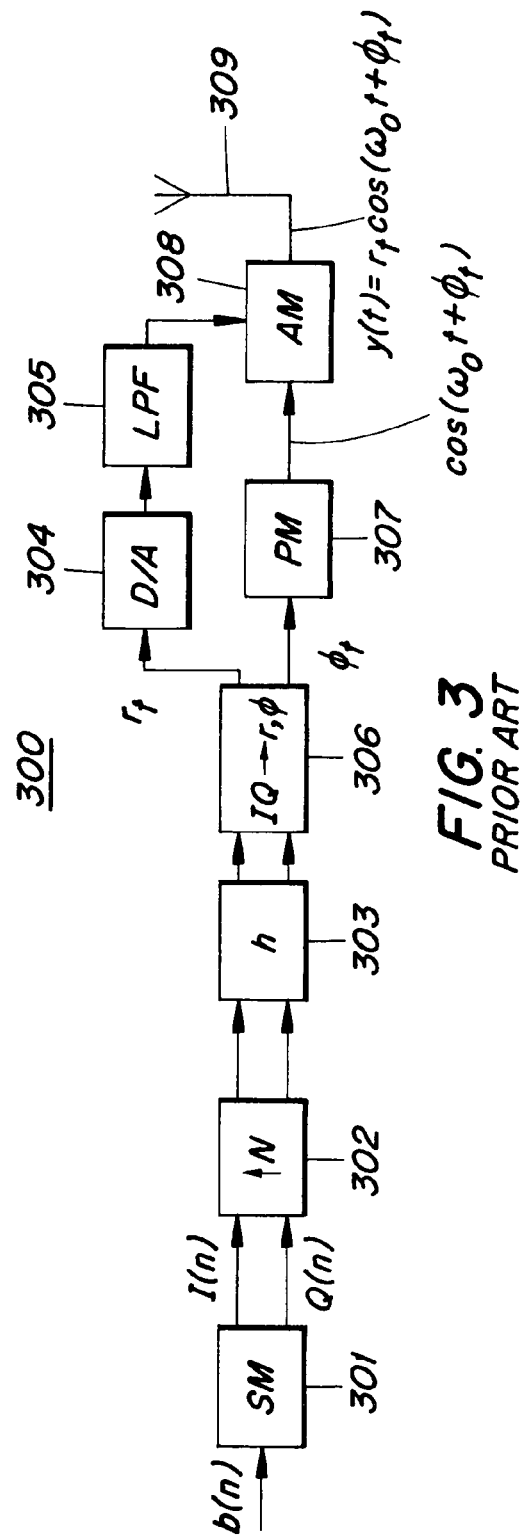

SELECTIVELY CONTROLLED MODULATION DISTORTION OF AN IQ-BASEBAND SIGNAL

BACKGROUND

The present invention relates to signal transmission for wireless mobile devices. More particularly, the present invention relates to a method and apparatus for reducing the bandwidth of a signal, while retaining the desired signal information and while satisfying system requirements, EVM requirements, and spectrum-mask requirements. The method and apparatus are applicable to both IQ-modulators and polar modulators, thereby allowing cost-effective polar modulators and/or cost-effective power amplifiers to be utilized. The method and apparatus are described below with reference to examples utilizing M-ary phase shift keying (M-PSK), such as quaternary phase-shift keying (QPSK) and 8-PSK; and M-ary quadrature amplitude modulation (M-QAM); however, the invention is not intended to be limited to such and may be applied to other approaches for signal generation.

The bandwidth in wireless digital communication systems is a limited resource. Accordingly, in most communication standards, such as GSM (Global System for Mobile Communications), EDGE (Enhanced Data Rates for GSM and TDMA/136 Evolution) and WCDMA (Wideband Code Division Multiple Access), the frequency bandwidth of a transmitted signal is strictly regulated by the system specifications. In addition, to provide for good reception of the transmitted signal, the shape of the transmitted signal in the time domain is also regulated in the system specifications. However, the standards often allow for some small spectrum leakage outside the desired frequency band and also for some signal distortions in the time domain to allow for cost-efficient and current-efficient transmitter architectures. These allowances make it possible to reduce production costs and prices of hand-held mobile devices.

The allowed signal distortions in the time domain are often measured in terms of error vector magnitude (EVM), that is, as a ratio between the square root of the power of an error vector and the square root of the transmitted mean power. FIG. 1A illustrates an example of a constellation of transmitted signal points 101 relative to reference signal points 102 in the IQ-plane for a QPSK system architecture. As illustrated in FIG. 1A, for example, for signals based upon QPSK, the error vector is a vector representing the difference between a transmitted signal vector $y_i$ and a reference signal vector $R_i$. As indicated by Equation 1, determining the EVM involves summing the squares of the magnitudes of a number of error vectors $$EVM = \sqrt{\frac{\frac{1}{N}\sum_{i=1}^{N}|e_i|^2}{\frac{1}{N}\sum_{i=1}^{N}|y_i|^2}} \quad (1)$$

In general, the magnitude of the EVM should be less than some prescribed value. For example, in WCDMA, the EVM should be less than 17.5%.

In addition, the allowed frequency distortions are often measured using a spectrum mask, an example of which is illustrated in FIG. 1B. FIG. 1B illustrates an example of an ideal (or reference) signal spectrum 103, a signal spectrum for a transmitted signal 104, and a spectrum mask 105 that defines the allowable extent of high-order frequencies for the transmitted signal spectrum. In other words, the spectrum mask 105 specifies the allowed shape of the frequency spectrum of the transmitted signal. Those skilled in the art will recognize that the signal spectrum for a transmitted signal 104 may extend beyond the bounds of an ideal signal spectrum 103 such as illustrated in FIG. 1B because the transmitted signal may possess high-order frequency components.

In many communication systems, linear modulation, such as QPSK (WCDMA) and 8-PSK (EDGE) are used. A common method for generating and transmitting linear modulation like QPSK over a bandwidth-limited wireless link utilizes IQ-modulation, such as illustrated in the block diagram of FIG. 2. FIG. 2 illustrates a conventional signal generation and transmission system 200 based upon IQ-modulation, comprising a symbol mapping unit (SM) 201, an up-sampling unit (↑N) 202, a pulse-shaping filter (h) 203, a digital-to-analog converter (D/A) 204, a low-pass filter (LPF) 205, mixers 206 and 207, a combiner 208, a power amplifier (not shown), and an antenna 209. The mixers 206 and 207 may be considered to form a modulator.

As illustrated in FIG. 2, data bits b(n) are mapped to symbols using the symbol mapping unit 201 (n refers to pulse numbering). The output from the symbol mapping unit 201 is a sequence of symbols, each of which can be represented as a complex quantity I(n)+jQ(n) with two components, I(n) and Q(n). Examples utilizing such mapping are QPSK and 8-PSK, which are well known in the art. It should be noted that the I and Q components retain their separate character throughout the signal processing in the system 200 until the I and Q components are summed and amplified in the power amplifier.

With reference to FIG. 2, the I and Q output signals from the symbol mapping 201 unit together form a complex-valued pulse train that is up-sampled in the up-sampling unit 202. The up-sampled pulse train is then fed into the pulse-shaping filter 203. The pulse-shaping filter 203 provides the desired shape in the time and frequency domains to the baseband signal according to the system specifications. The output signals from the pulse-shaping filter 203 are then digital-to-analog (D/A) converted in the D/A converter 204, and the resulting output signals are then fed into the low-pass filter 205. The I and Q components of the baseband signal are then fed into mixers 206 and 207, respectively, to generate I and Q radio frequency (RF) signals from the supplied baseband signals. The I and Q radio frequency signals are then combined and amplified in the power amplifier and are then directed to the antenna 208 for transmission over the air.

Conventional signal generation and transmission systems employing IQ-modulation have power amplifiers with stringent linearity requirements given the modulation depth (ratio between the maximum and minimum amplitude of a transmitted signal) for conventional I and Q signals. In conventional systems, these stringent linearity requirements necessitate the use of high-performance power amplifiers that are expensive.

Another method for generating linear modulation utilizes a polar modulator. Polar modulation operates on the principle that complex-valued symbols may be represented in polar coordinates (r, φ) corresponding to amplitude and phase instead of rectangular coordinates (I, Q). FIG. 3 illustrates a conventional signal generation and transmission system 300 based upon polar modulation, comprising a symbol mapping unit (SM) 301, an up-sampling unit (↑N)

302, a pulse-shaping filter (h) 303, a D/A converter (D/A) 304, a low-pass filter (LPF) 305, a rectangular-to-polar mapping unit 306, a phase modulator (PM) 307, an amplitude modulator 308, a power amplifier (not shown), and an antenna 309.

As illustrated in FIG. 3, data bits b(n) are mapped to symbols using the symbol mapping unit 301. The output from the symbol mapping unit 301 is a sequence of symbols, each of which can be represented as a complex quantity I(n)+jQ(n) with two components, I(n) and Q(n). The output signals from the symbol mapping unit 301 form a complex-valued pulse train and are up-sampled in the up-sampling unit 302. The output signals from the up-sampling unit 302 are then fed into the pulse-shaping filter 303. The I and Q signals output from the pulse-shaping filter 303 are then mapped to polar coordinates (phase and amplitude) in the mapping unit 306. The phase signal output from the mapping unit 306 is input to the phase modulator 307, which generates the phase portion of the radio signal. The amplitude signal output from the mapping unit is D/A converted in the digital-to-analog converter 304, the output from which is then fed into the low-pass filter 305. The amplitude signal output from the low-pass filter 305 and the phase signal output from phase modulator 307 are then combined in the amplitude modulator 308. The output signal from the amplitude modulator is then amplified by a power amplifier (not shown) and directed to the antenna 309.

An advantage of a system architecture utilizing a polar modulator is that the radio part of the system can be produced at lower cost compared to a conventional IQ-modulator. Another advantage is that a polar modulator consumes less current than a conventional IQ-modulator. However, there are drawbacks to utilizing a polar modulator. In particular, linear modulation is optimized for linear signal generation with conventional IQ-modulators, and the generation of linear modulation with a polar modulator results in amplitude and phase signals having a very high bandwidth. Accordingly, to prevent unwanted distortion of the output signal y(t) in a conventional polar modulator system, the phase modulator 307 and the amplitude modulator 308 must be produced with very high quality components such that they have sufficient bandwidth capability to effectively provide the high-bandwidth amplitude and phase signals. Typically, the phase modulator 307 and the amplitude modulator 308 must have a bandwidth capability about 3–5 times the bandwidth of the IQ signals in order to effectively represent the phase and amplitude signals without encountering unacceptable levels of distortion in the output signal y(t). Stated differently, the phase modulator 307 and the amplitude modulator 308 must have the above-noted bandwidth capability to fulfill the imposed system requirements such that the EVM does not exceed the prescribed level and such that the power spectrum of the transmitted signal does not exceed the limits of the spectrum mask. As a result, the required phase modulator 307 and amplitude modulator 308 are expensive, and the cost of these high-performance devices largely negates the cost savings and current-consumption savings associated with the radio part of a system utilizing a polar modulator.

Accordingly, there is a need for a method of signal generation that reduces the phase signal and amplitude signal bandwidths of a polar-modulation signal, and that reduces the modulation depth of an IQ-modulation signal, while retaining the desired signal information and while satisfying system specification requirements, EVM requirements and spectrum-mask requirements such that cost-efficient and current-efficient polar modulators and/or power amplifiers can be utilized. There is also a need for an apparatus that accomplishes these goals.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In one aspect of the invention, a radio frequency signal is generated that represents a sequence of information bits. Generating the radio frequency signal comprises generating a resultant baseband signal by selectively generating either a non-distorted complex-valued baseband signal or a distorted complex-valued baseband signal, wherein selective generation is based upon values of information bits in the sequence of information bits, and generating the radio frequency signal from the resultant baseband signal. For any given sequence of information bits represented by the distorted complex-valued baseband signal, the distorted complex-valued baseband signal deviates from a reference baseband signal corresponding to the given sequence of information bits.

In another aspect of the invention, the above-noted technique may be carried out such that, for any given sequence of information bits represented by the distorted complex-valued baseband signal, the given sequence of information bits comprises a first group of information bits and a second group of information bits, the distorted complex-valued baseband signal comprises a distorted complex-valued signal point that represents the first group of the given sequence of information bits, the reference baseband signal corresponding to the given sequence of information bits comprises a reference complex-valued signal point that represents the first group of the given sequence of information bits, and the distorted complex-valued signal point is different from the reference complex-valued signal point. In addition, the distorted complex-valued signal point may differ from the reference complex-valued signal point by a predetermined complex-valued distortion amount. Moreover, generating the distorted complex-valued baseband signal may comprise generating a preliminary complex-valued baseband signal that comprises the reference complex-valued signal point, and modifying the preliminary complex-valued baseband signal to form the distorted complex-valued baseband signal, comprising adding a predetermined complex-valued distortion amount to the reference complex-valued signal point to generate the distorted complex-valued signal point. Furthermore, the predetermined complex-valued distortion amount may be obtained from a lookup table.

In other aspects of the invention, the above-noted technique may be carried out such that it further includes, for any given sequence of information bits represented by the distorted complex-valued baseband signal, generating distorted amplitude and phase signals from the resultant baseband signal, wherein at least one of the distorted amplitude and phase signals has a lower bandwidth than a corresponding bandwidth of reference amplitude and phase signals generated from the reference baseband signal corresponding to the given sequence of information bits. In addition, the above-noted technique may be implemented in an M-PSK architecture (e.g., a QPSK architecture or an 8-PSK architecture) or in an M-QAM architecture. Moreover, the above-noted technique may be carried out such that generating the radio frequency signal from the resultant baseband signal comprises generating polar phase and amplitude signals from the resultant baseband signal, and generating the radio frequency signal from the polar phase and amplitude signals.

In another aspect of the invention, the above-noted technique may be carried out such that, for any given sequence of information bits represented by the distorted complex-valued baseband signal, the given sequence of information bits comprises a first group of information bits and a second group of information bits. In addition, in this aspect, the distorted complex-valued baseband signal comprises a first complex-valued signal point that represents the first group of the given sequence of information bits, a second complex-valued signal point that represents the second group of the given sequence of information bits, and one or more distorted trajectory complex-valued signal points in between the first complex-valued signal point and the second complex-valued signal point. Moreover, in this aspect, the reference baseband signal corresponding to the given sequence of information bits comprises a first reference complex-valued signal point that represents the first group of information bits, a second reference complex-valued signal point that represents the second group of information bits, and one or more complex-valued reference trajectory signal points in between the first reference complex-valued signal point and the second reference complex-valued signal point. Furthermore, in this aspect, the first complex-valued signal point is equal to the first reference complex-valued signal point, the second complex-valued signal point is equal to the second reference complex-valued signal point, and at least one of the distorted trajectory complex-valued signal points is different from a corresponding one of the reference trajectory complex-valued signal points.

In the immediately preceding aspect, the technique may be carried out such that the at least one of the distorted trajectory complex-valued signal points differs from the corresponding one of the reference trajectory complex-valued signal points by a predetermined complex-valued distortion amount. In addition, the technique may be carried out such that generating the distorted complex-valued baseband signal comprises selecting a distorted trajectory comprising the at least one of the distorted trajectory complex-valued signal points from a lookup table. Further, generating the distorted complex-valued baseband signal may comprise generating a preliminary complex-valued baseband signal that comprises the first reference complex-valued signal point, the second reference complex-valued signal point, and at least one non-distorted trajectory complex-valued signal point, and modifying the preliminary complex-valued baseband signal, comprising adding a predetermined complex-valued distortion amount to the at least one non-distorted trajectory complex-valued signal point to generate said at least one distorted trajectory complex-valued signal point. Furthermore, the predetermined complex-valued distortion amount may be obtained from a lookup table.

BRIEF DESCRIPTION OF THE DRAWINGS

FIG. 2 is a block diagram of a signal generation and transmission system for a conventional IQ-modulator;

FIG. 3 is a block diagram of a signal generation and transmission system for a conventional polar modulator;

DETAILED DESCRIPTION

Figure 1A:
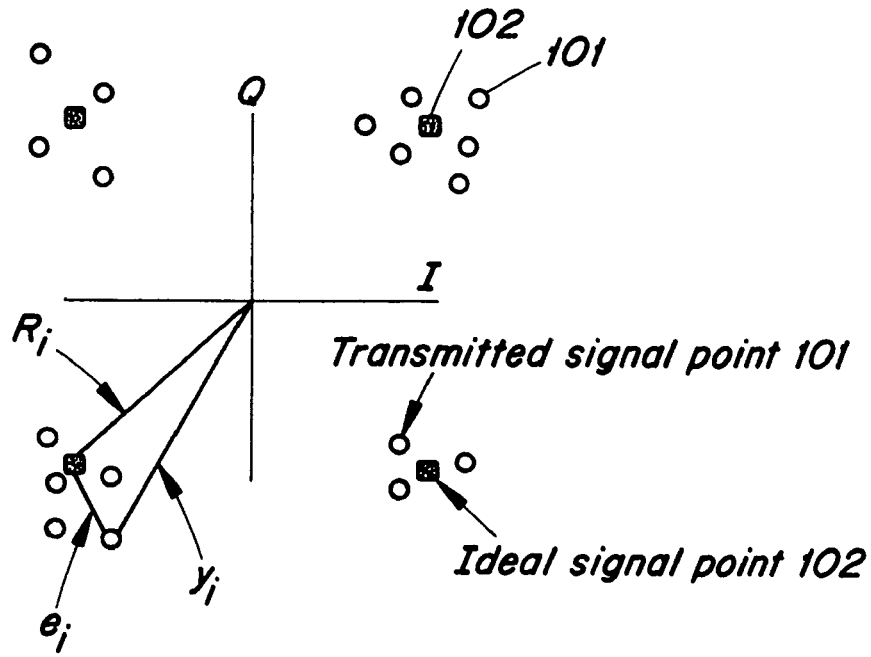
FIG. 1A is an illustration of an example of a constellation of transmitted signal points relative to reference signal points in the IQ-plane for a QPSK system architecture.
Figure 1B:
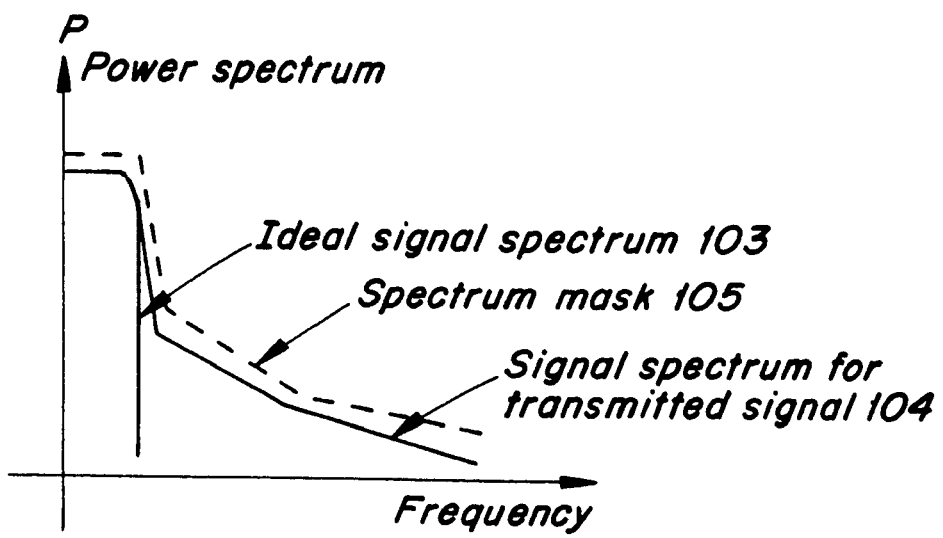
FIG. 1B is an illustration of an example of an ideal signal spectrum, a signal spectrum for a transmitted signal, and a spectrum mask that defines the allowable extent of high-order frequencies for the transmitted signal spectrum.

The disclosed embodiments address the need for a method of signal generation involving the use of either a polar modulator or an IQ-modulator, the method and device reducing the bandwidth of the transmitted polar-modulation signals and reducing the modulation depth (i.e., the ratio between the maximum and minimum amplitudes) of IQ-modulated signals, while fulfilling system requirements, EVM requirements and spectrum-mask requirements such that cost-efficient and current-efficient polar modulators and/or cost-efficient power amplifiers can be utilized. The disclosed embodiments also address the need for an apparatus that accomplishes this goal.

The present invention provides a method and apparatus for reducing the phase and amplitude bandwidths of a polar-modulation signal and for reducing the modulation depth of IQ-modulated signals, while retaining the desired signal information and while satisfying system requirements, EVM requirements and spectrum-mask requirements by introducing a controlled distortion to an IQ baseband signal, the method and device being applicable to both IQ-modulators and polar modulators, thereby allowing cost-efficient and current-efficient polar modulators and/or cost-efficient power amplifiers to be utilized.

These and other aspects of the invention will now be described in greater detail in connection with a number of exemplary embodiments. To facilitate an understanding of the invention, many aspects of the invention are described in terms of actions to be performed by a control unit and a distortion unit. It will be recognized that in each of the embodiments, the various actions could be performed by elements of a computer system. Further, it will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier such as solid-state memory, magnetic disk, optical disk or carrier wave (such as radio frequency, audio frequency or optical frequency carrier waves) containing an appropriate set of computer instructions that would cause a processor to carry out the techniques described herein. Further, the invention can additionally be considered to be embodied within an appropriate set of computer instructions that can be downloaded via a network connection to cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Figure 4A:
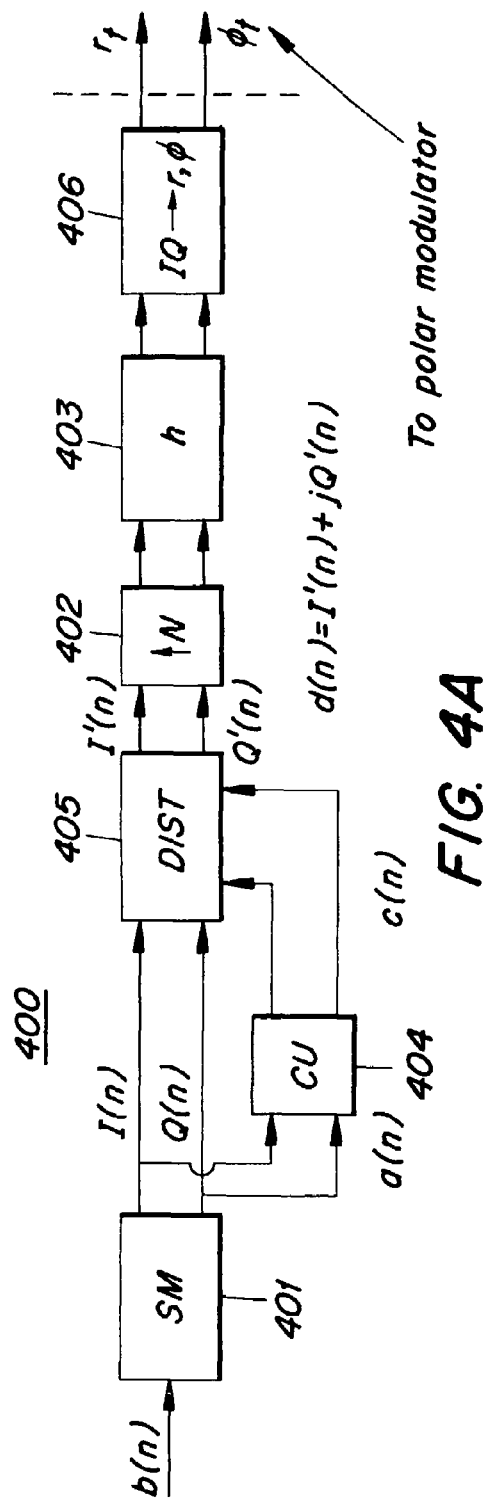
FIG. 4A is a block diagram of a signal generation and transmission system according to a first embodiment of the invention.

An exemplary embodiment of the present invention is illustrated in the block diagram of FIG. 4A. FIG. 4A illustrates a signal generation and transmission system 400 based upon polar modulation, comprising a symbol mapping unit (SM) 401, an up-sampling unit (↑N) 402, a pulse-shaping filter (h) 403, a control unit (CU) 404, a signal distortion unit (DIST) 405, a rectangular-to-polar conversion unit 406, and a conventional polar modulator (not shown). An example of a sequence of signal operations carried out by the above-noted signal generation and transmission system 400 will now be described for a QPSK system with reference to FIGS. 4A, 4B and 4C; however, it should be noted that the invention is not intended to be limited to a QPSK system and may be applied to an 8-PSK system, a QAM system, or other systems for signal generation.

Figure 4B:
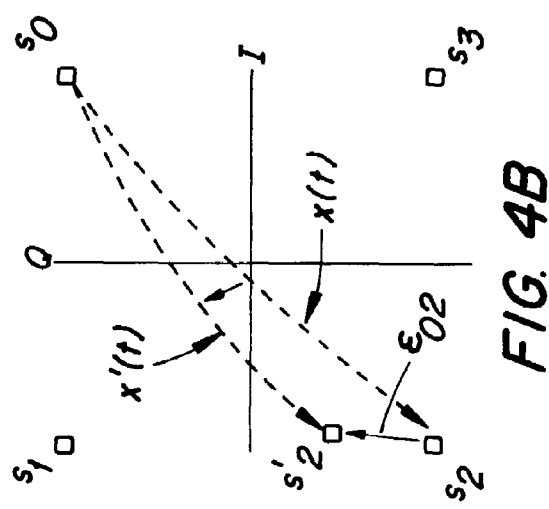
FIG. 4B is an illustration of an exemplary trajectory of a transmitted signal from a first predefined (reference) signal point to a distorted signal point in the IQ-plane for a QPSK system also showing the difference between the trajectories in the IQ-plane of the transmitted signal trajectory and the reference signal trajectory according to the first embodiment.
Figure 4C:
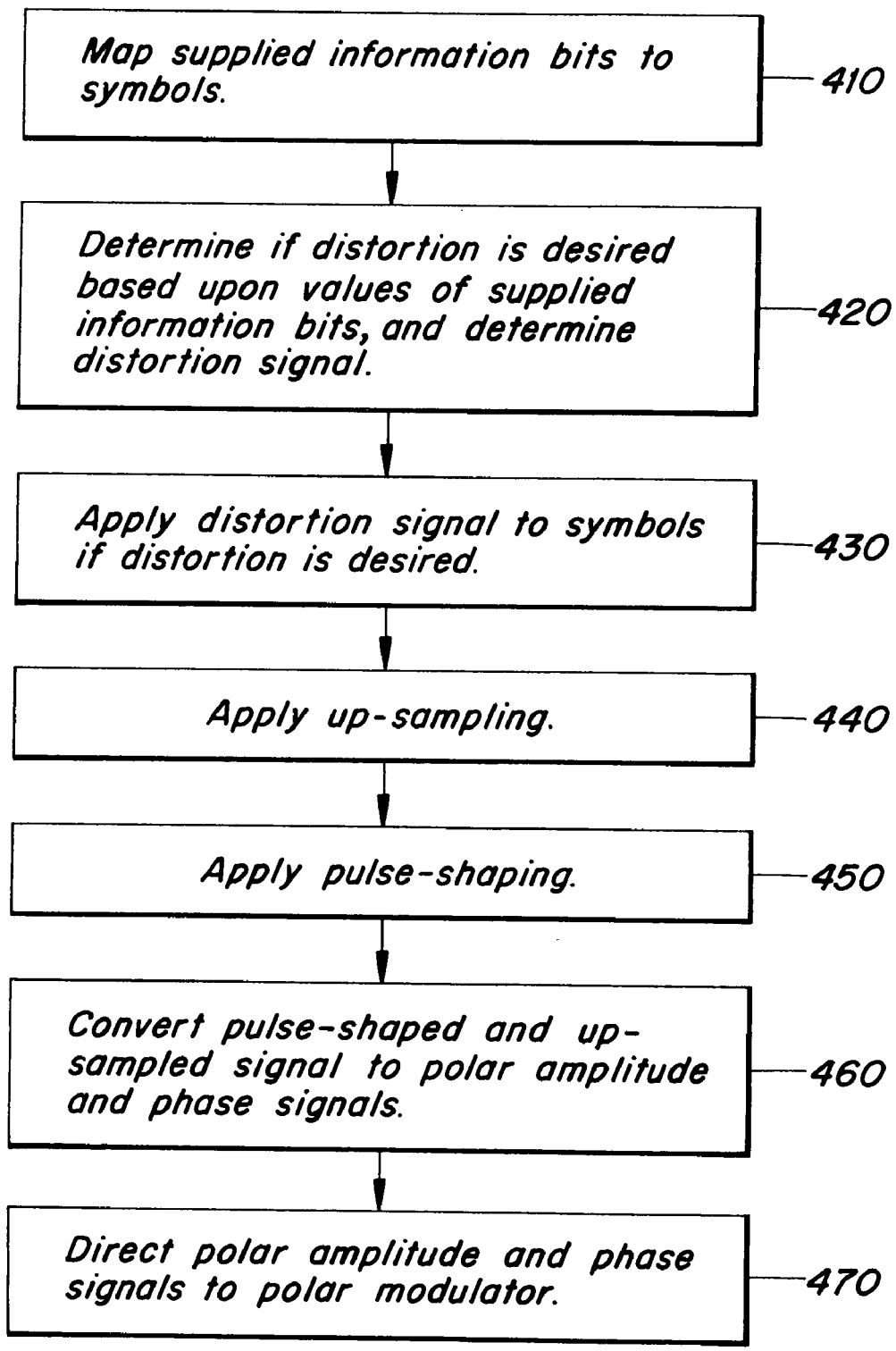
FIG. 4C is a flow chart of the steps carried out in one embodiment of the invention.

As illustrated in FIG. 4A and by the steps in FIG. 4C, information bits (or data bits) b(n) are mapped to symbols, for example $s_0$, $s_1$, $s_2$ and $s_3$ for QPSK such as illustrated in FIG. 4B, using the symbol mapping unit 401, the symbols corresponding to a reference baseband signal as described below (step 410). In particular, the output signal from the symbol mapping unit 401 is a sequence of symbols a(n), where n is an integer. Each symbol a(n) can be represented as a complex quantity $a(n)=I(n)+jQ(n)$ with two components, I(n) and Q(n), in the IQ-plane, such as illustrated in FIG. 4B. The signal a(n) may be considered to be both a sequence of symbols and, in this embodiment, a complex-valued reference baseband signal. For any given value of n, a(n) may also be considered a complex-valued non-distorted signal point. The sequence of symbols a(n) from the symbol mapping unit 401 forms a complex-valued pulse train, which is supplied to both the control unit 404 and the distortion unit 405.

Based upon the relationship between pairs of consecutive symbols generated by the symbol mapping unit 401 (which is, in turn, a function of the original sequence of supplied information bits, b(n)), the control unit 404 determines whether a distortion signal is desired and, if so, determines a distortion signal c(n) that is then applied to one of the symbols a(n) in the distortion unit 405 to form a first baseband signal $d(n)=I'(n)+jQ'(n)$ (steps 420 and 430). As described in greater detail below, the control unit 404 may make this determination by examining a present symbol a(i) and the previous symbol a(i−1). The control unit may also examine the previous signal point d(i−1) rather than the symbol a(i−1) in making the determination, as described in greater detail below. Alternatively, the control unit 404 may employ look-ahead capability to make this determination by examining the present symbol a(i) and the next symbol a(i+1) to determine whether a distortion should be applied to a(i). Alternatively, it is also possible for the control unit to make this determination from an examination of the supplied information bits, b(n). Each of these possibilities as well as others involving determinations based on any signals derived from the supplied information bits b(n) are referred to throughout this specification as making the determination "based upon values of information bits in a sequence of information bits." As discussed in greater detail below, pairs of signals with signal trajectories corresponding to a very large phase shift, such as the π phase shift trajectory x(t) illustrated in FIG. 4B between symbols $s_0$ and $s_2$, are chosen to undergo distortion.

For example, the distortion signal c(n) may be added to the signal a(n), such as illustrated in example sequence (2) below:

$$a(n): \cdots \quad s_1 \quad s_0 \quad s_2 \quad\quad s_3 \quad s_2 \quad \cdots \quad (2)$$
$$c(n): \cdots \quad 0 \quad 0 \quad \varepsilon_{02} \quad\quad 0 \quad 0 \quad \cdots$$
$$d(n): \cdots \quad s_1 \quad s_0 \quad s_2+\varepsilon_{02} \quad s_3 \quad s_2 \quad \cdots.$$

For signals for which a distortion is desired, a distortion signal is applied to one of a pair of associated consecutive symbols, such as illustrated by distortion signal $\varepsilon_{02}$ in example sequence (2) above (where the subscript "02" indicates that the distortion signal is intended for a transition from $s_0$ to $S_2$). For signals that do not need correction, the corresponding distortion signal may be specified as "0" as illustrated in example sequence (2) above. A distortion signal of "0" may be viewed as an additive distortion amount of zero such that no distortion is made. Alternatively, a distortion signal of "0" may be interpreted as an instruction signal that instructs the correction unit to make no distortion to the reference base band signal.

The distortion signal is preferably determined such that the modulated RF signal generated from the distorted baseband signal will fulfill the system requirements, EVM requirements and spectrum-mask requirements. Furthermore, in general, phase and amplitude signals from which the modulated RF signal is generated will have lower phase and amplitude bandwidths when generated from the distorted baseband signal than phase and amplitude signals generated from a corresponding non-distorted baseband signal. The manner in which these reduced bandwidths are provided and the operation of the control unit 404 will be described in greater detail below.

The utilization of the up-sampling unit 402 and the pulse-shaping filter will now be described with reference to FIGS. 4A and 4C. After applying the distortion signal, if desired, the first baseband signal d(n) is up-sampled in the up-sampling unit 402 (step 440). The up-sampled signals from the up-sampling unit 402 are then supplied to the pulse-shaping filter 403, which provides the desired shape in the time and frequency domains to the resultant baseband signal according to the system specifications (step 450). The signal that exits the pulse-shaping filter 403 may be referred to as a resultant baseband signal. The resultant baseband signal exiting the pulse-shaping filter 403 is then converted to polar amplitude and phase signals $r_t$ and $\phi_t$ in the rectangular-to-polar conversion unit 406 (step 460). The polar amplitude and phase signals $r_t$ and $\phi_t$ may then be supplied to a conventional polar modulator for signal transmission (step 470). It should be noted that because the amplitude and phase signals $r_t$ and $\phi_t$ from the rectangular-to-polar conversion unit 406 have lower bandwidths than would otherwise be obtained if distortion were not applied as described above, a conventional cost-efficient and current-efficient polar modulator may be used for signal transmission.

It should be noted that, where no distortion is applied to a given symbol, the corresponding first baseband signal d(n) may be considered a non-distorted complex-valued baseband signal. For a given symbol where distortion is applied, the corresponding first baseband signal d(n) may be considered a distorted complex-valued baseband signal. Where distortion is applied, the distorted complex-valued baseband signal deviates from a corresponding reference baseband signal. It should be noted that, in this context, a reference baseband signal refers to one that conventional signal generation systems would aspire to produce. The distorted complex-valued baseband signal and such a corresponding reference baseband signal both represent the same given sequence of information bits and represent the same information desired to be transmitted over the air. Accordingly, those skilled in the art will realize that the resultant baseband signal is generated by selectively generating either a non-distorted complex-valued baseband signal or a distorted complex-valued baseband signal based upon values of information bits in the sequence of information bits, b(n).

Figure 4D:
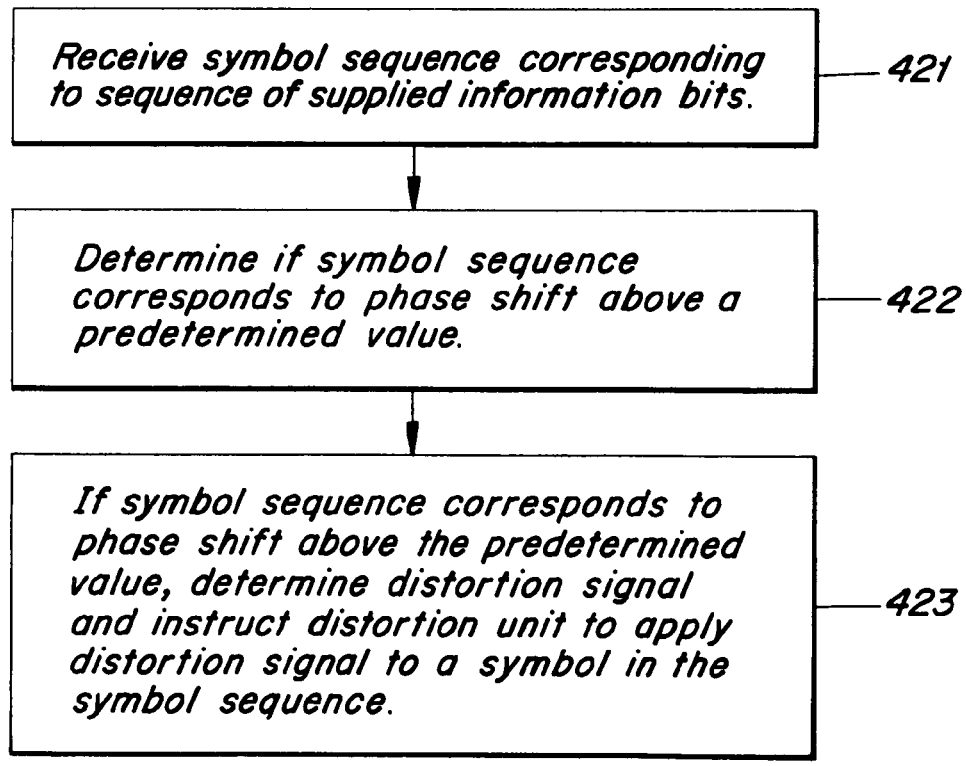
FIG. 4D is a flow chart of the steps carried out by the control unit in the first embodiment of the invention.

The operation of the control unit 404 in conjunction with the symbol mapping unit 404 and the distortion unit 405 will now be described in greater detail. In particular, the steps carried out by the control unit 404 will be described with reference to the flow chart of FIG. 4D. In this regard steps 421, 422 and 423 illustrated in FIG. 4D may be viewed as detailed steps corresponding to step 420 in FIG. 4C. As noted above, the symbol mapping unit 401 generates a sequence of symbols, which correspond to the information bits supplied to the signal mapping unit 401. A first group of information bits in the sequence is mapped to a first symbol (e.g., $s_0$), and a second group of information bits in the sequence is mapped to a second symbol (e.g., $s_2$). In QPSK, for example, two information bits correspond to each symbol. In addition, in this embodiment, the first group of information bits may be considered as corresponding to a first reference complex-valued signal point (referred to, for example, as $s_0$), and the second group of information bits may be considered as corresponding to a second reference complex-valued signal point (referred to, for example, as $s_2$).

The control unit 404 receives the first and second symbols corresponding to the supplied information bits from the symbol mapping unit 401 (step 421). The control unit then determines if a distortion is desired by determining whether the first and second symbols have a corresponding phase shift greater than a predetermined value. For example, a sequence of two consecutive symbols $s_0$ and $s_2$ with a $\pi$ phase shift is illustrated in FIG. 4B for a QPSK system. For the particular implementation illustrated in FIG. 4B, a corresponding up-sampled and pulse-shaped signal would possess a trajectory x(t) that passes near the origin (0,0) in the IQ-plane. The signal spectrum for this phase shift has significant high-frequency components in both the IQ signal and its corresponding amplitude and phase signal, and this symbol sequence is recognized by the control unit 404 as one for which distortion is desired. It is also possible to make this determination from an examination of the supplied information bits, b(n). Each of these possibilities as well as others involving determinations based on any signals derived from the supplied information bits b(n) are referred to throughout this specification as making the determination "based upon values of information bits in a sequence of information bits." In the example of FIG. 4B, the distortion is supplied by a distortion signal corresponding to the vertical distortion vector $\epsilon_{02}$ extending from the reference complex-valued signal point (symbol) $s_2$ to a distorted complex-valued signal point $s'_2$. The resultant baseband signal resulting from this distortion has a corresponding trajectory x'(t) illustrated in FIG. 4B. Thus, distorting one of the signal points results in a distortion of the trajectory as well. In contrast, in the example of FIG. 4B, a symbol sequence between two consecutive symbols $s_0$ and $s_1$ has a phase shift of $\pi/2$. The signal spectrum for the $\pi/2$ phase shift has a smaller bandwidth than that for the $\pi$ phase shift in both the IQ signal its corresponding amplitude and phase signals, and is recognized by the control unit 404 as not needing distortion.

Whether a given non-distorted signal trajectory corresponding to a sequence of two consecutive symbols should be distorted depends upon the phase shift (and associated signal spectrum) of the non-distorted signal trajectory and the desired bandwidth limitations. How much of a distortion to apply further depends upon the desired bandwidth limitations. Those skilled in the art are able to determine the signal spectrum associated with the phase shift corresponding to a given non-distorted signal trajectory using conventional signal analysis techniques. Using this knowledge, those skilled in the art may determine which non-distorted signal trajectories should be distorted, depending upon the particular desired bandwidth limitations. In the QPSK system, identifying such trajectories may be done by inspection; trajectories corresponding to phase shifts of $\pi$ should be distorted. In other systems, such as 8-PSK and 16-QAM, the situation is more complicated given the distribution of a greater number of symbols in the IQ-plane. In systems such as 8-PSK, 16-QAM or other more complicated systems, the teachings described herein can be used to determine which trajectories have phase shifts (e.g., greater than a predetermined value) with sufficiently high signal spectrums such that distortion is desired, given an amount of bandwidth reduction desired. Moreover, those skilled in the art will recognize that the amount of distortion applied must not be so severe that the distortion leads to significant errors in interpreting the transmitted information.

Referring again to FIG. 4D, if the control unit 404 determines that a symbol sequence corresponds to a phase shift above a predetermined value as discussed above (step 422), the control unit then determines a distortion signal c(n) and instructs the distortion unit to apply the distortion signal to the one of the symbols a(n) (step 423) as discussed above.

In particular, the control unit 404 determines a complex-valued distortion amount $\epsilon_{pq}$ (also referred to as an adjustment value or adjustment quantity) for the distortion signal c(n) to be applied to one of the symbols (non-distorted reference signal points) corresponding to a given signal trajectory between symbols $s_p$ and $s_q$, with the distortion amount $\epsilon_{pq}$ depending upon the consecutive symbols received from the symbol mapping unit 401 (which, in turn, depend upon the supplied information bits, b(n)). In the example of FIG. 4B, the start symbol is $s_0$ and the end symbol is $s_2$, and the complex-valued distortion amount $\epsilon_{02}$ is specified as a vertical distortion vector extending from the end symbol $s_2$ to a transmitted signal point $s'_2$. A signal a(n), a distortion signal c(n), and a first baseband signal d(n) consistent with the trajectory illustrated in the example of FIG. 4B are given in example sequence (2) noted above.

In the example of FIG. 4B, a complex-valued distortion amount $\epsilon_{02}$ is illustrated as being oriented vertically in the IQ-plane in FIG. 4B. However, it should be noted that, generally, the complex-valued distortion amount $\epsilon_{pq}$ (e.g., $\epsilon_{02}$) could be chosen to extend horizontally as opposed to vertically in the IQ-plane or at other angles as well. Nearly any direction for $\epsilon_{pq}$ may be utilized as long as the direction deviates sufficiently from the direction between the start and end symbols, and the magnitude of the distortion value is large enough to achieve the desired bandwidth reduction. The direction and magnitude of $\epsilon_{pq}$ are reflected in the complex-valued aspect of $\epsilon_{pq}$. In view of the teachings herein, it is within the purview of one skilled in the art to choose an appropriate complex-valued distortion amount to achieve a desired bandwidth limitation.

The complex-valued distortion amount should not only achieve the desired bandwidth limitation but should also preferably satisfy system specification requirements, EVM requirements, and spectrum mask requirements, while safeguarding against confusion with other signal points. In the QPSK system illustrated in FIG. 4B, it is generally preferable that the $\epsilon_{pq}$ extend either horizontally or vertically from a given symbol in the IQ-plane. Moreover, though the complex-valued distortion amount $\epsilon_{02}$ in FIG. 4B is illustrated as extending from the end symbol rather than from the start symbol, any of the complex-valued distortion amounts $\epsilon_{pq}$ could be chosen to extend from the start symbol instead of the end symbol. The control unit 404 could employ a look-ahead capability in this instance as noted previously. Appropriate predetermined complex-valued distortion amounts $\epsilon_{pq}$ may be determined by straightforward calculation as noted above or by trial-and-error measurements of complex-valued distortion amounts $\epsilon_{pq}$ that preferably satisfy the above-noted requirements.

Figure 8A:
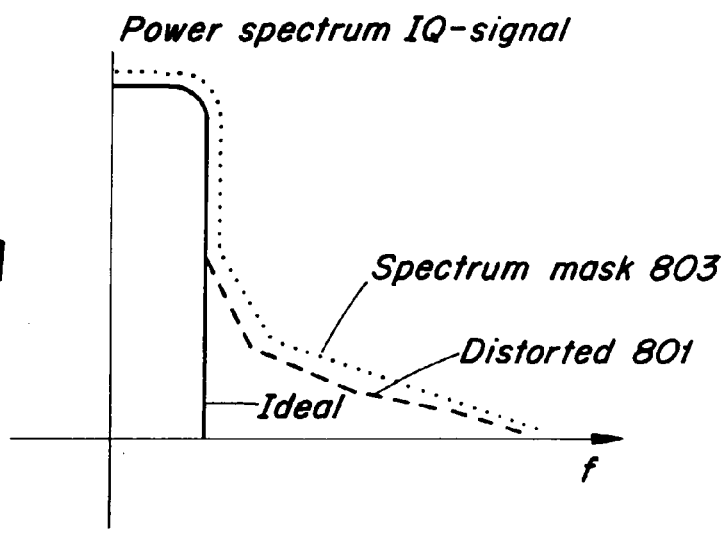
FIG. 8A is a graph depicting the power spectrum of a distorted IQ signal.
Figure 8B:
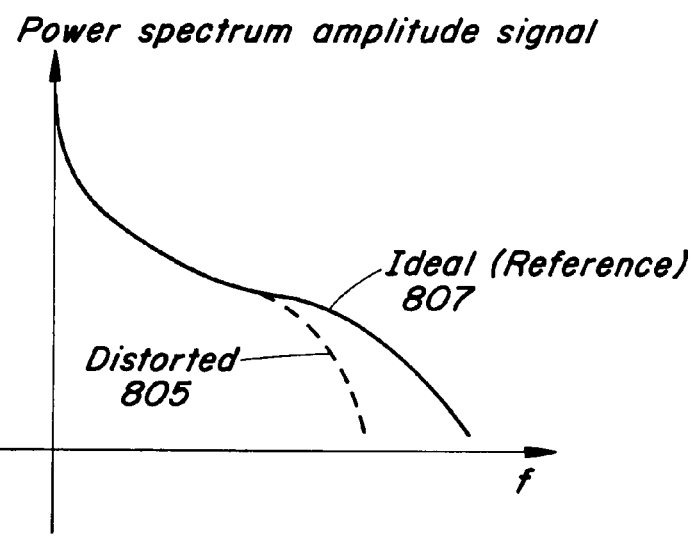
FIG. 8B is a graph depicting the power spectrum of a corresponding distorted amplitude signal.
Figure 8C:
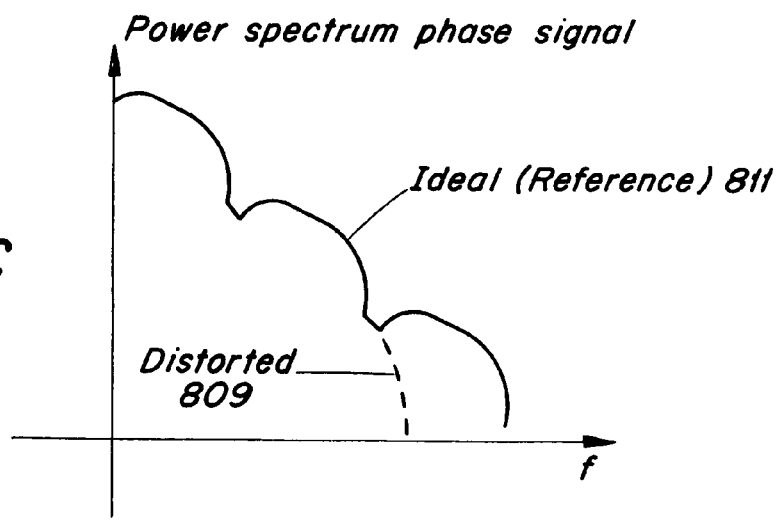
FIG. 8C is a graph depicting the power spectrum 809 of a corresponding distorted phase signal.

FIGS. 8A, 8B and 8C illustrate the effect that the above-described distortion has on the power spectra of the respective IQ, amplitude and phase signals. More particularly, FIG. 8A is a graph depicting the power spectrum 801 of a distorted IQ signal. It can be seen that, while the bandwidth of the power spectrum 801 has not been reduced, it is still within the boundaries imposed by the system-defined spectrum mask 803. By comparison, FIG. 8B is a graph depicting the power spectrum 805 of a corresponding distorted amplitude signal. Here it can be seen that the bandwidth of the power spectrum 805 has been substantially reduced compared to the bandwidth of an ideal (reference) power spectrum 807. Similarly, FIG. 8C is a graph depicting the power spectrum 809 of a corresponding distorted phase signal. Here it can be seen that the bandwidth of the power spectrum 809 has been substantially reduced compared to the bandwidth of an ideal (reference) power spectrum 811.

It should be noted that in the QPSK system, signal trajectories corresponding to $\pi/2$ phase shifts do not need to be distorted as described above because the associated symbol sequences do not correspond to signals with large high-frequency components. In other words, for the example in FIG. 4B, signals corresponding to the sequences $s_0 \leftrightarrows s_1$, $s_1 \leftrightarrows s_2$, $s_2 \leftrightarrows s_3$, and $S_3 \leftrightarrows s_0$ do not need to be distorted. However, as indicated above, it is beneficial to distort signals corresponding to the sequences $s_0 \leftrightarrows s_2$ and $s_3 \leftrightarrows s_1$ in the QPSK system as reflected in the example of FIG. 4B. Moreover, it should be noted that if a symbol sequence involves two consecutive transitions with trajectories having $\pi$ phase shifts, such as $s_0 \rightarrow s_2 \rightarrow s_0$, only the intermediate signal point needs to be distorted such that the distorted signal sequence is $s_0 \rightarrow s'_2 \rightarrow s_0$. To carry out this type of distortion, the control unit 404 may determine whether to distort the next signal point based on whether a distortion was applied to the preceding signal point as noted previously. Alternatively, the distortion $s_0 \rightarrow s'_2 \rightarrow s'_0$ could be executed wherein the signal point $s_0$ is distorted to a signal point $s'_0$ (not shown in FIG. 2) chosen for bandwidth reduction in the manner in which $s'_2$ is chosen. In this case, the control unit 404 may determine the distortions to be applied based upon the information bits b(n) without regard to whether a preceding signal point was distorted.

In view of the above description, those skilled in the art will recognize that the above-described method and apparatus provide for selectively generating either a non-distorted complex-valued baseband signal (such as one that does not deviate from a reference baseband signal designed to represent the symbol sequence $s_0 \leftrightarrows s_1$ in FIG. 4B) or a distorted complex-valued baseband signal (such as the one in FIG. 4B having a trajectory x'(t), which does deviate from a reference baseband signal having trajectory x(t), both the distorted and reference baseband signals representing the symbol sequence $s_0 \leftrightarrows s_2$) based upon values of information bits in the sequence of information bits b(n). A resultant baseband signal ultimately generated from the selectively generated non-distorted or distorted complex-valued baseband signal can then be modulated to form a radio frequency signal. Moreover, for any given sequence of information bits, the distorted complex-valued baseband signal deviates from a reference baseband signal corresponding to the given sequence of information bits.

Figure 5A:
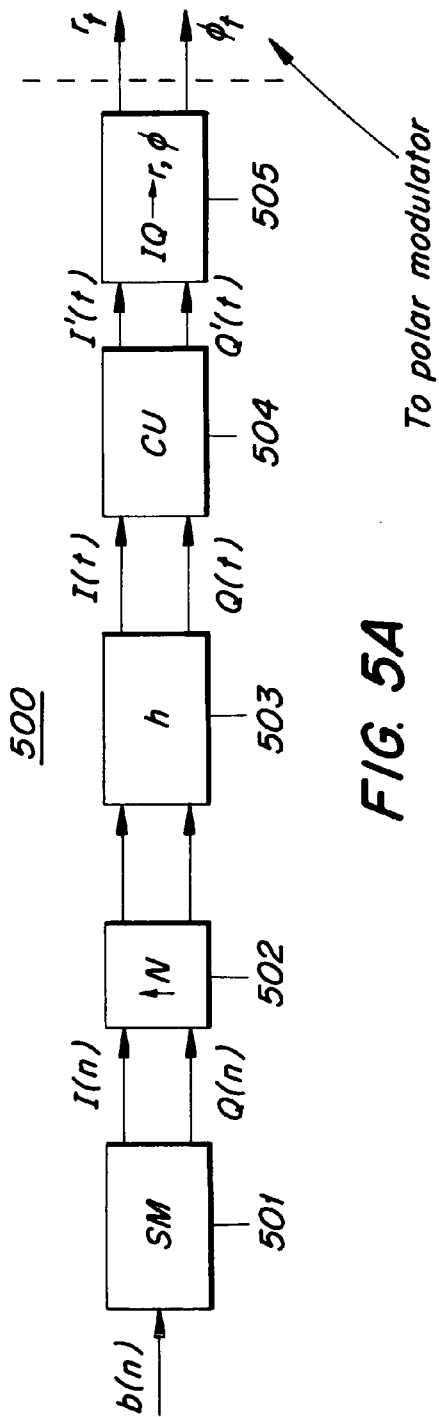
FIG. 5A is a block diagram of a signal generation and transmission system according to another embodiment of the invention.

A second embodiment of the present invention is illustrated in the block diagram of FIG. 5A. FIG. 5A illustrates a signal generation and transmission system 500 based upon polar modulation, comprising a symbol mapping unit (SM) 501, an up-sampling unit (↑N) 502, a pulse-shaping filter (h) 503, a control unit (CU) 504, a rectangular-to-polar conversion unit 505, and a conventional polar modulator (not shown). An example of a sequence of signal operations carried out by the above noted signal generation and transmission system 500 will now be described for a QPSK system with reference to FIGS. 5A, 5B and 5C; however, it should be noted that the invention is not intended to be limited to a QPSK system and may be applied to an 8-PSK system, higher-order PSK system, QAM system, or other modulation systems.

Figure 5B:
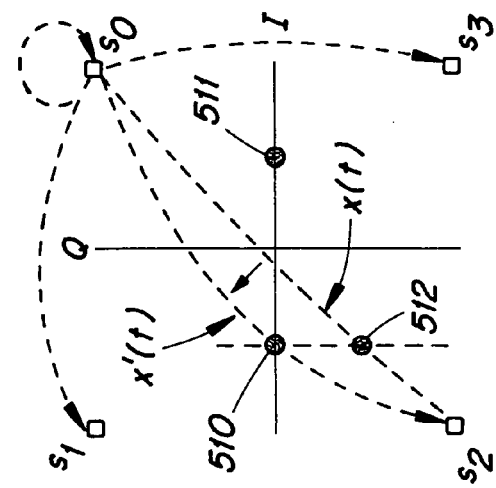
FIG. 5B is an illustration of an exemplary trajectory of a transmitted signal between two predefined signal points in the IQ-plane for a QPSK system, wherein the trajectory x'(t) of the transmitted signal is distorted from the predefined (reference) signal trajectory x(t)
Figure 5C:
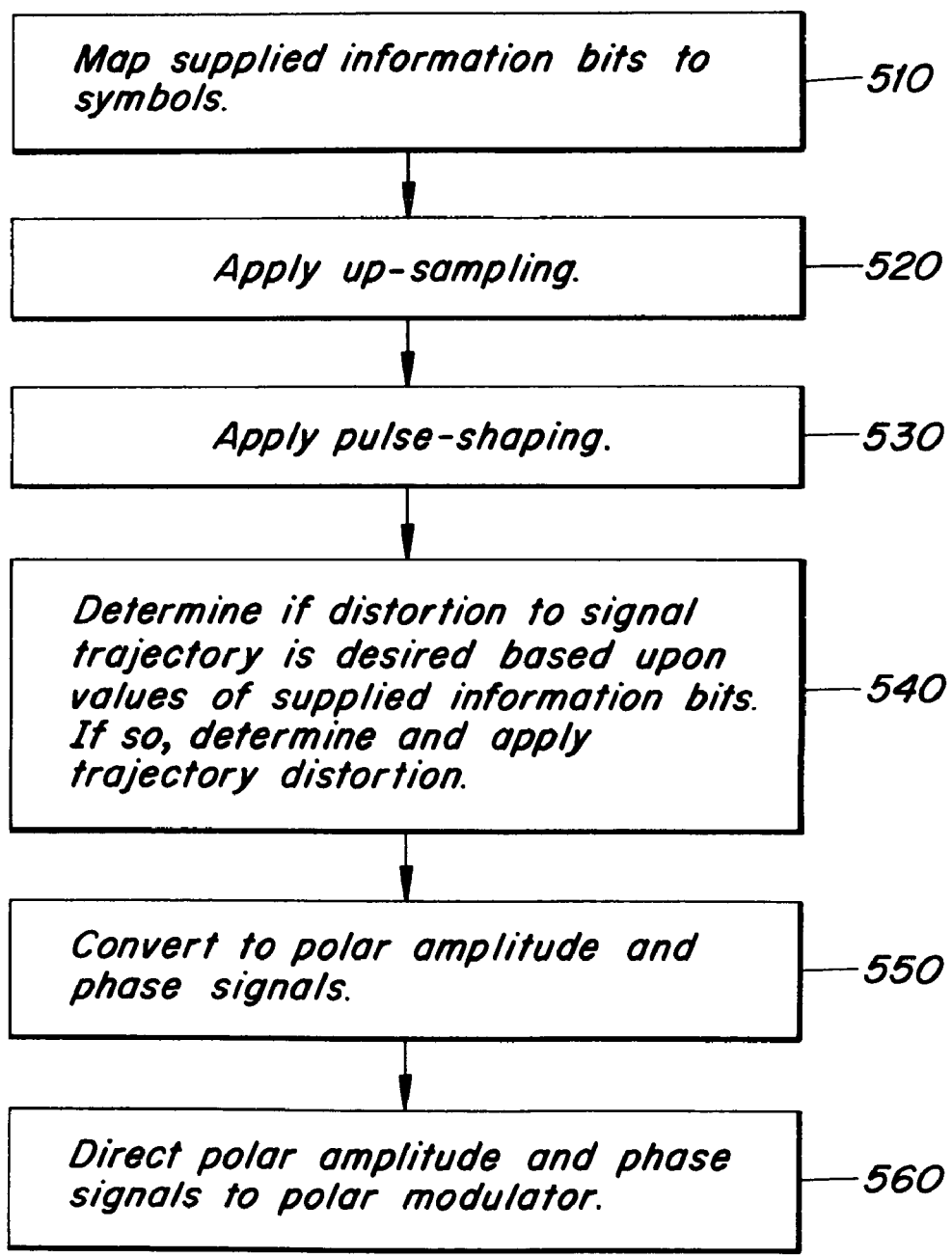
FIG. 5C is a flow chart of the steps carried out in an embodiment of the invention.

As illustrated in FIG. 5A and by the steps in FIG. 5C, a sequence of information bits b(n) is mapped to symbols using the symbol mapping unit 501 (step 510). The output from the symbol mapping unit 501 has two components, I(n) and Q(n), such as noted previously. The output signals from the symbol mapping unit 501 represent a complex-valued pulse train and are up-sampled in the up-sampling unit 502 (step 520). The signals from the up-sampling unit 502 are then supplied to the pulse-shaping filter 503, which provides the desired shape in the time and frequency domains to the baseband signal according to the system specifications (step 530). The signals from the pulse-shaping filter 503 are then supplied to the control unit 504. Based upon the pulse-shaped signals received by the control unit 504, the control unit 504 determines whether a signal transmission possesses a signal trajectory that has a phase shift exceeding a predetermined value for which a distortion to the signal trajectory is desired and, if so, applies the distortion (step 540). As noted previously, based on the teachings herein, one skilled in the art will be able to determine an appropriate predetermined value of phase shift for determining whether a signal trajectory should be distorted. The determination for whether a given trajectory should be distorted can, of course, be made by inspecting the original information bits, b(n), or any intermediary form of the corresponding symbols. All of these possibilities are herein referred to as making the determination "based upon values of information bits in a sequence of information bits."

An example of a signal trajectory for which distortion is desired is shown by the reference trajectory x(t) illustrated in FIG. 5B, and an exemplary trajectory after distortion is shown by distorted trajectory x'(t). As can be seen from FIG. 5B, the distortion applied by the control unit 504 in this embodiment results in a distorted trajectory that extends between non-distorted start and end signal points (complex-valued reference points) for the desired signal. In other words, unlike the previous embodiment, the start and end signal points of the distorted baseband signal are not, themselves, distorted. It is the intermediary trajectory values of the distorted baseband signal that are distorted. Like the previous embodiment described above, signal trajectories that do not have phase shifts exceeding a predetermined amount need not be distorted. The trajectory distortion will be described in greater detail below.

If trajectory distortion is desired, the control unit 504 determines and applies the appropriate trajectory distortion that preferably will retain the desired signal information while fulfilling the system requirements, EVM requirements and spectrum-mask requirements and while providing reduced bandwidths for the amplitude and phase signals. The resulting I' and Q' signals from the control unit 504 may be considered a resultant baseband signal, which is then converted to polar amplitude and phase signals $r_t$ and $\phi_t$ in the rectangular-to-polar conversion unit 505 (step 550). The amplitude and phase signals $r_t$ and $\phi_t$ are then directed to a conventional polar modulator (not shown) for signal transmission (step 560). It should be noted that a conventional cost-efficient and current-efficient polar modulator may be used for signal transmission because, when distortion is applied, the amplitude and phase signals $r_t$ and $\phi_t$ output from the rectangular-to-polar conversion unit 505 have lower bandwidths than would otherwise be obtained if the reference baseband signal were not distorted as described above.

The operation of the control unit 504 will now be described in greater detail.

If the control unit 504 determines that a trajectory distortion should be applied to the second baseband signal and applies the trajectory distortion, the resultant baseband signal will comprise a distorted complex-valued baseband signal. This distorted complex-valued baseband signal comprises a first complex-valued baseband signal point (e.g., a start point such as $s_0$ in FIG. 5B) and a second complex-valued baseband signal point (e.g., an end point such as $s_2$ in FIG. 5B). The distorted complex-valued baseband signal also comprises one or more complex-valued distorted trajectory signal points, such as point 510 illustrated in FIG. 5B. As can be seen in FIG. 5B, the distortion applied by the control unit 504 in this example results in a distorted trajectory that extends between the original start and end signal points (e.g., first and second non-distorted reference signal points) for the desired signal. In other words, unlike the previous embodiment, in this embodiment, the first and second complex-valued signal points of the distorted complex-valued signal are the same as the first and second non-distorted reference signal points. However, at least one complex-valued distorted trajectory signal point along the distorted trajectory, such as point 510 illustrated in FIG. 5B, is different from a corresponding complex-valued reference trajectory signal point, such as point 512 illustrated in FIG. 5B. Like the previous embodiment described above, signal trajectories that do not have phase shifts exceeding a predetermined value determined according to concepts previously described need not be distorted.

Figure 5D:
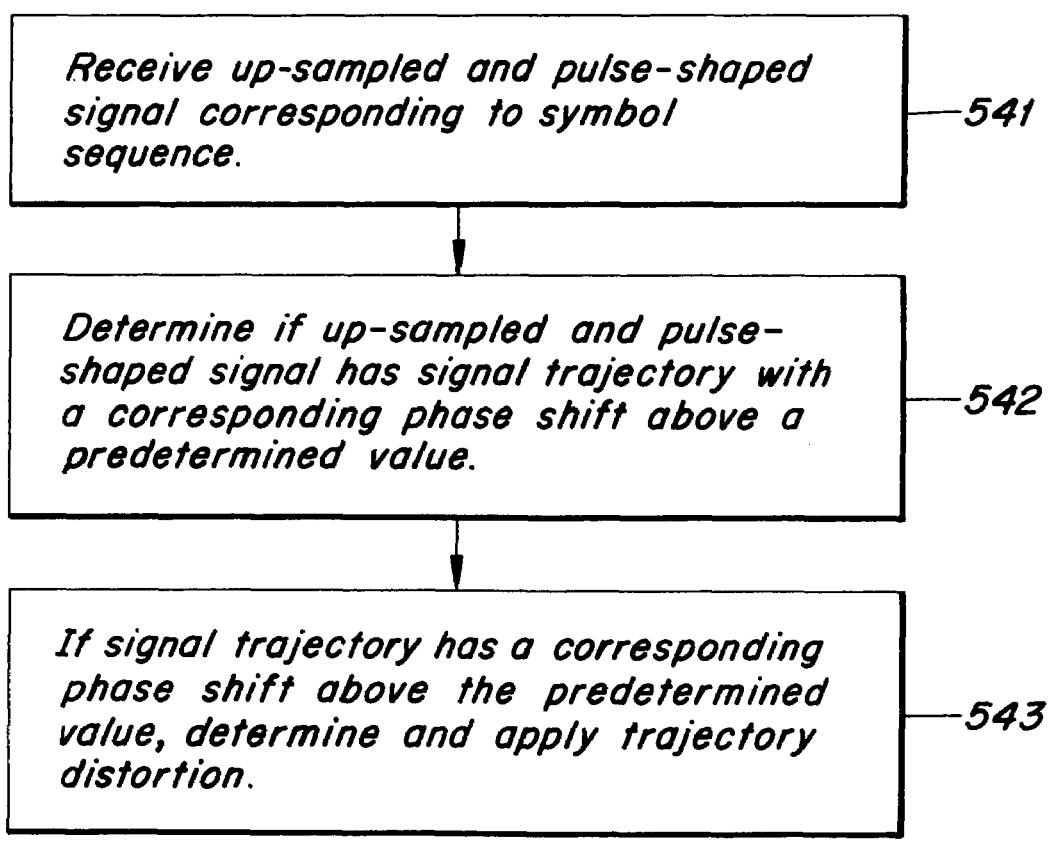
FIG. 5D is a flow chart of the steps carried out by the control unit in an embodiment of the invention.

The operation of the control unit 504 will now be described in greater detail. In particular, the steps carried out by the control unit 504 will be described with reference to the flow chart of FIG. 5D. In this regard, it should be noted that steps 541–543 illustrated in FIG. 5D correspond to step 540 illustrated in FIG. 5C. As noted above, the control unit 504 receives an up-sampled and pulse-shaped signal corresponding to the symbol sequence I(n) and Q(n) (step 541). (The control unit 504 could alternatively examine the supplied information bits b(n) or any of the intermediate signals generated from the supplied information bits b(n).) The control unit 504 then determines if the signal trajectory should be distorted by determining whether the signal trajectory for the desired signal transmission has a phase shift that exceeds a predetermined value (step 552), such as described previously. If the phase shift of the signal trajectory exceeds the predetermined value, the control unit 504 determines and applies a trajectory distortion (step 543). Distorted signal trajectories may read from a look-up table. As noted previously, an example of such a distorted trajectory is shown by trajectory x'(t) illustrated in FIG. 5B for a QPSK system.

The preferred trajectory for a given signal transmission may be determined in advance by straightforward calculation or by trial-and-error measurements based on test trajectories until distorted trajectories are found that produce the desired bandwidth reductions in the phase and amplitude signals while satisfying the system requirements, EVM requirements and spectrum-mask requirements. These distorted trajectories may then be stored and read from a look-up table. Alternatively, predetermined complex-valued distortion amounts corresponding to the distorted trajectories may be stored and read from a look-up table rather than the distorted trajectories themselves. At least one complex-valued trajectory signal point for a distorted trajectory should be different from a corresponding complex-valued reference trajectory signal point.

Those skilled in the art will recognize that multiple trajectories can be found for a given signal transmission that satisfy the above-noted requirements. For example, though the distorted trajectory x'(t) illustrated in FIG. 5B is shown as passing through the point 510 to the left of the origin, the trajectory could alternatively be chosen to pass through the point 511 to the right of the origin. Moreover, it will be recognized that other distorted trajectories could also be utilized as long as the distorted trajectory deviates sufficiently from the reference trajectory to reduce the bandwidth as desired while preferably satisfying the system requirements, EVM requirements and spectrum-mask requirements.

Figure 6A:
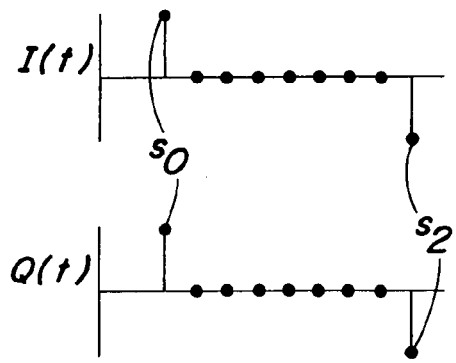
FIG. 6A illustrates up-sampled I and Q signals for a desired (reference) signal transmission in an embodiment of the invention.
Figure 6B:
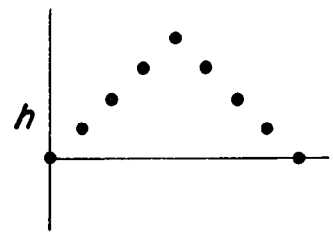
FIG. 6B illustrates an exemplary pulse-shaping filter for use in the invention.
Figure 6C:
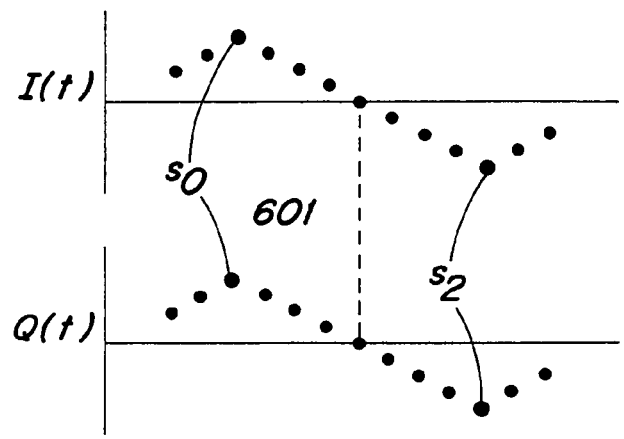
FIG. 6C illustrates up-sampled I and Q signals after up-sampling and pulse shaping according to FIGS. 6A and 6B.
Figure 6D:
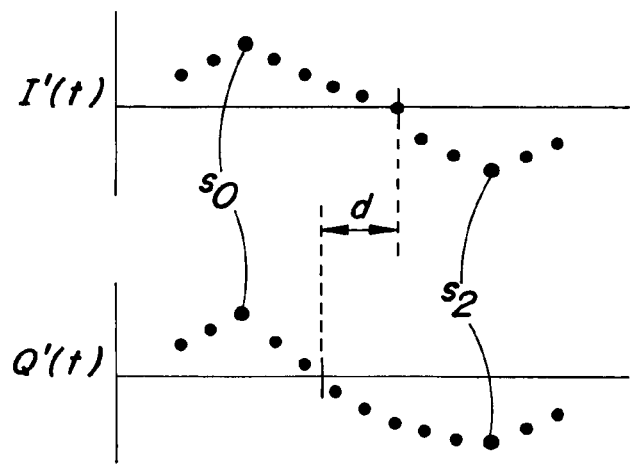
FIG. 6D illustrates exemplary I and Q signals after distortion according to an embodiment of the invention.

An example of a distorted trajectory expressed in terms of the I and Q pulse shapes and the I' and Q' pulse shapes is illustrated in FIGS. 6A–6D for the $s_0 \rightarrow s_2$ symbol sequence shown in the example of FIG. 5B. FIG. 6A illustrates the I and Q signals for the desired signal transmission after up-sampling where zeros have been padded between the start and end symbols. FIG. 6B illustrates an example of a pulse-shaping filter. FIG. 6C shows the pulse shape of the ideal I and Q signals after being pulse-shaped with the filter h. It should be noted that both the I and Q signals pass through their respective zero points at the same time as indicated at point 601 in FIG. 6C. Accordingly, the amplitude and phase signals corresponding to this signal shape have high frequency components. FIG. 6D shows the distorted I' and Q' pulse shapes (i.e., the distorted trajectory) after action by the control unit 504. The portions of the pulse shapes between the points labeled $s_0$ and $s_2$ are distorted pulse shapes obtained, for example, from a look-up table by the control unit 504. It should be noted that the I' and Q' pulse shapes pass through their respective zeros at different points in time as indicated by the arrow labeled d in FIG. 6D. These pulse shapes allow the desired signal information (the $S_0 \rightarrow s_2$ transition) to be transmitted while reducing the bandwidth of the transmitted signal and while fulfilling system requirements, EVM requirements, and spectrum-mask requirements. Those skilled in the art will recognize that the deviations of the I' and Q' pulse shapes (FIG. 6D) from the corresponding I and Q pulse shapes (FIG. 6C) are indicative of complex-valued distortion amounts applied to the I' and Q' pulse shapes. It should be noted, however, that the pulse shapes in FIGS. 6C and 6D are intended only to be illustrative and are not intended to reflect actual distortion amounts.

Some studies have shown that, without distortion, the bandwidths of the amplitude and phase signals are, for example, three to four times the bandwidth of the corresponding IQ signal. Using controlled distortion as described above, the IQ signal bandwidth increases slightly, but the bandwidths of the amplitude and phase signals are substantially reduced to, for example, only two to three times the original IQ signal bandwidth. This represents a substantial improvement.

Another embodiment of the invention is also provided, which is a variation on an embodiment already described. Whereas the invention described with reference to FIGS. 4A and 4B has been described as being applicable to a signal generation and transmission system involving polar modulation such that cost-efficient and current-efficient polar modulators may be utilized, the embodiment described here utilizes the signal distortion method and apparatus illustrated in FIG. 4A and 4B in conjunction conventional IQ-modulation rather than with polar modulation. In particular, the control unit 404 and the distortion unit 405 of the first embodiment illustrated in FIG. 4A may be inserted into a conventional IQ-signal generation and transmission system such as the system 200 illustrated in FIG. 2. Specifically, the control unit 404 and the distortion unit 405 may be inserted between symbol mapping unit 201 and up-sampling unit 202 shown in FIG. 2. This approach allows power amplifiers with less stringent linearity requirements to be utilized in view of the reduced modulation depth of distorted IQ signals.

Another embodiment of the invention is also provided, which is a variation on an embodiment already described. Whereas the invention described with reference to FIGS. 5A and 5B has been described as being applicable to a signal generation and transmission system involving polar modulation such that cost-efficient and current-efficient polar modulators may be utilized, the embodiment described here utilizes the signal distortion method and apparatus illustrated in FIGS. 5A and 5B in conjunction conventional IQ-modulation rather than with polar modulation. In particular, the control unit 504 illustrated in FIG. 5A may be inserted into a conventional IQ-signal generation and transmission system such as the system 200 illustrated in FIG. 2. Specifically, the control unit 504 may be inserted between the pulse-shaping filter 203 and the D/A converter 204 shown in FIG. 2. This approach, like the approach described directly above, allows power amplifiers with less stringent linearity requirements to be utilized in view of the reduced modulation depth of the distorted IQ signals.

The invention has been described with reference to particular embodiments. However, it will be readily apparent to those skilled in the art that it is possible to embody the invention in specific forms other than those of the embodiments described above. This may be done without departing from the spirit of the invention. For example, the techniques pertaining to the embodiments described above may be combined if desired. In addition, for example, although the symbol mapping unit 401, the control unit 404 and the distortion unit 405 are illustrated as separate components in FIG. 4A, these components could be replaced by a single symbol mapping unit that examines information bits and directly maps those bits to a sequence of symbols that achieves the results previously described herein with respect to a separate distorting step. Alternatively, a separate conventional symbol mapping unit 401 could be retained, and the functions of the control unit 404 (e.g., a controller) and the distortion unit 405 could be combined in a single control unit. In addition, whereas the determination for whether a distortion should be applied has been described as being based upon consecutive pairs of symbols in a symbol sequence, this determination could be made based upon three or more consecutive symbols. Moreover, the control unit 504 illustrated as a single unit in FIG. 5A could be configured as a control unit and a separate distortion unit.

Figure 7:
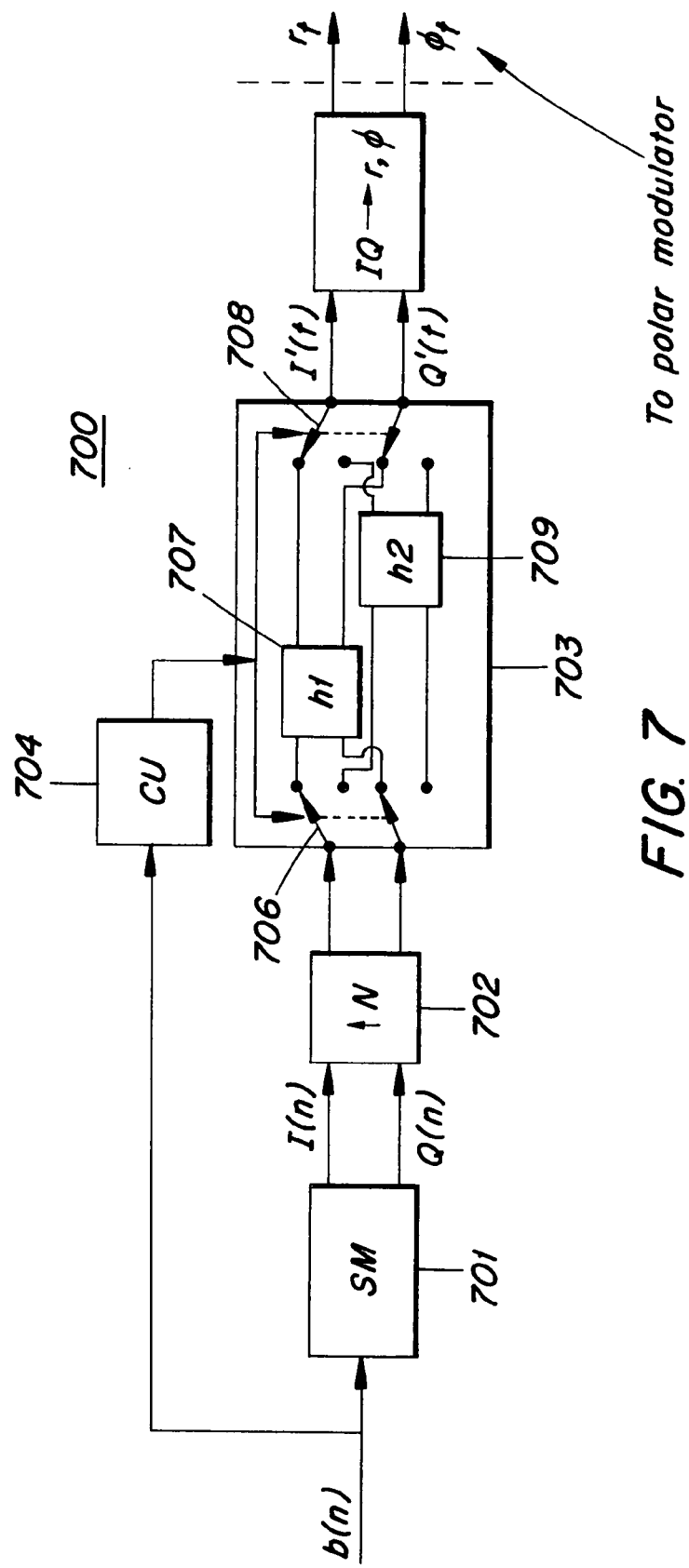
FIG. 7 is a block diagram of a signal generation and transmission system according to another embodiment of the invention.

Furthermore, it is possible to configure the pulse-shaping filter 503 and the control unit 504 illustrated in FIG. 5B differently, for example, as illustrated in FIG. 7. In this regard, information bits b(n) are supplied to both the symbol mapping unit 701 and the control unit 704. The control unit supplies a signal to the pulse-shaping filter unit 703 (for example, to switches 706 and 708) that selectively applies one filter characteristic, h1 (707), or another filter characteristic, h2 (709), to the up-sampled signal from the up-sampling unit 702 based upon values of information bits in the sequence of information bits, b(n). In this example, the first filter characteristic h1 (707) could apply the same filtering to both the I and Q paths so that no distortion would be applied. By contrast, the second filter characteristic h2 (709) could then apply one sort of filtering to the I path and a different filtering to the Q path, in order to bring about the desired distortion. In this embodiment, the signal supplied to the control unit 704 could alternatively be any intermediary signal derived from the sequence of information bits, b(n). In addition, the control unit 704 and the pulse-shaping filter unit 703 could alternatively be configured as a single unit that carries out the above-noted functions.

The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating a radio frequency signal that represents a sequence of information bits, the method comprising:
   selecting whether to generate either a non-distorted complex-valued baseband signal or a distorted complex-valued baseband signal based upon values of information bits in the sequence of information bits;
   generating a resultant baseband signal by selectively generating either the non-distorted complex-valued baseband signal or the distorted complex-valued baseband signal based on a selection made by the selecting step; and
   generating the radio frequency signal from the resultant baseband signal,
   wherein for any given sequence of information bits represented by the distorted complex-valued baseband signal, the distorted complex-valued baseband signal deviates from a reference baseband signal corresponding to the given sequence of information bits.

2. The method of claim 1, wherein for any given sequence of information bits represented by the distorted complex-valued baseband signal:
   the given sequence of information bits comprises a first group of information bits and a second group of information bits;
   the distorted complex-valued baseband signal comprises a distorted complex-valued signal point that represents the first group of the given sequence of information bits;
   the reference baseband signal corresponding to the given sequence of information bits comprises a reference complex-valued signal point that represents the first group of the given sequence of information bits; and
   the distorted complex-valued signal point is different from the reference complex-valued signal point.

3. The method of claim 2, wherein the distorted complex-valued signal point differs from the reference complex-valued signal point by a predetermined complex-valued distortion amount.

4. A method of generating a radio frequency signal that represents a sequence of information bits, the method comprising:
   generating a resultant baseband signal by selectively generating either a non-distorted complex-valued baseband signal or a distorted complex-valued baseband signal, wherein selective generation is based upon values of information bits in the sequence of information bits; and
   generating the radio frequency signal from the resultant baseband signal,
   wherein for any given sequence of information bits represented by the distorted complex-valued baseband signal, the distorted complex-valued baseband signal deviates from a reference baseband signal corresponding to the given sequence of information bits,
   wherein for any given sequence of information bits represented by the distorted complex-valued baseband signal:
   the given sequence of information bits comprises a first group of information bits and a second group of information bits;
   the distorted complex-valued baseband signal comprises a distorted complex-valued signal point that represents the first group of the given sequence of information bits;
   the reference baseband signal corresponding to the given sequence of information bits comprises a reference complex-valued signal point that represents the first group of the given sequence of information bits; and
   the distorted complex-valued signal point is different from the reference complex-valued signal point, and
   wherein generating the distorted complex-valued baseband signal comprises:
   generating a preliminary complex-valued baseband signal that comprises the reference complex-valued signal point; and
   modifying the preliminary complex-valued baseband signal to form the distorted complex-valued baseband signal, comprising adding a predetermined complex-valued distortion amount to the reference complex-valued signal point to generate the distorted complex-valued signal point.

5. The method of claim 4, wherein the predetermined complex-valued distortion amount is obtained from a lookup table.

6. The method of claim 1, further comprising:
   for any given sequence of information bits represented by the distorted complex-valued baseband signal, generating distorted amplitude and phase signals from the resultant baseband signal,
   wherein at least one of the distorted amplitude and phase signals has a lower bandwidth than a corresponding bandwidth of reference amplitude and phase signals generated from the reference baseband signal corresponding to the given sequence of information bits.

7. The method of claim 1, wherein said method is implemented in an M-QPSK architecture or an M-QAM architecture.

8. The method of claim 1, wherein generating the radio frequency signal from the resultant baseband signal comprises:
   generating polar phase and amplitude signals from the resultant baseband signal; and
   generating the radio frequency signal from the polar phase and amplitude signals.

9. A method of generating a radio frequency signal that represents a sequence of information bits, the method comprising:
   generating a resultant baseband signal by selectively generating either a non-distorted complex-valued baseband signal or a distorted complex-valued baseband signal, wherein selective generation is based upon values of information bits in the sequence of information bits; and
   generating the radio frequency signal from the resultant baseband signal,
   wherein for any given sequence of information bits represented by the distorted complex-valued baseband signal, the distorted complex-valued baseband signal deviates from a reference baseband signal corresponding to the given sequence of information bits,
   wherein for any given sequence of information bits represented by the distorted complex-valued baseband signal:
   the given sequence of information bits comprises a first group of information bits and a second group of inforthe distorted complex-valued baseband signal comprises:
a first complex-valued signal point that represents the first group of the given sequence of information bits:
a second complex-valued signal point that represents the second group of the given sequence of information bits; and
one or more distorted trajectory complex-valued signal points in between the first complex-valued signal point and the second complex-valued signal point;
the reference baseband signal corresponding to the given sequence of information bits comprises:
a first reference complex-valued signal point that represents the first group of information bits;
a second reference complex-valued signal point that represents the second group of information bits; and
one or more complex-valued reference trajectory signal points in between the first reference complex-valued signal point and the second reference complex-valued signal point;
the first complex-valued signal point is equal to the first reference complex-valued signal point;
the second complex-valued signal point is equal to the second reference complex-valued signal point; and
at least one of the distorted trajectory complex-valued signal points is different from a corresponding one of the reference trajectory complex-valued signal points.

10. The method of claim 9, wherein the at least one of the distorted trajectory complex-valued signal points differs from the corresponding one of the reference trajectory complex-valued signal points by a predetermined complex-valued distortion amount.

11. The method of claim 9, wherein generating the distorted complex-valued baseband signal comprises selecting a distorted trajectory comprising the at least one of the distorted trajectory complex-valued signal points from a lookup table.

12. The method of claim 9, wherein generating the distorted complex-valued baseband signal comprises:
generating a preliminary complex-valued baseband signal that comprises the first reference complex-valued signal point, the second reference complex-valued signal point, and at least one non-distorted trajectory complex-valued signal point; and
modifying the preliminary complex-valued baseband signal, comprising adding a predetermined complex-valued distortion amount to the at least one non-distorted trajectory complex-valued signal point to generate said at least one distorted trajectory complex-valued signal point.

13. The method of claim 12, wherein the predetermined complex-valued distortion amount is obtained from a lookup table.

14. An apparatus for generating a radio frequency signal, comprising:
logic that selects whether to generate either a non-distorted complex-valued baseband signal or a distorted complex-valued baseband signal based upon values of information bits in the sequence of information bits;
logic that generates a resultant baseband signal by selectively generating either the non-distorted complex-valued baseband signal or the distorted complex-valued baseband signal based on a selection made by the logic that selects; and
logic that generates the radio frequency signal from the resultant baseband signal,
wherein for any given sequence of information bits represented by the distorted complex-valued baseband signal, the distorted complex-valued baseband signal deviates from a reference baseband signal corresponding to the given sequence of information bits.

15. The apparatus of claim 14, wherein for any given sequence of information bits represented by the distorted complex-valued baseband signal:
the given sequence of information bits comprises a first group of information bits and a second group of information bits;
the distorted complex-valued baseband signal comprises a distorted complex-valued signal point that represents the first group of the given sequence of information bits;
the reference baseband signal corresponding to the given sequence of information bits comprises a reference complex-valued signal point that represents the first group of the given sequence of information bits; and
the distorted complex-valued signal point is different from the reference complex-valued signal point.

16. The apparatus of claim 15, wherein the distorted complex-valued signal point differs from the reference complex-valued signal point by a predetermined complex-valued distortion amount.

17. An apparatus for generating a radio frequency signal, comprising:
logic that generates a resultant baseband signal by selectively generating either a non-distorted complex-valued baseband signal or a distorted complex-valued baseband signal, wherein selective generation is based upon values of information bits in the sequence of information bits; and
logic that generates the radio frequency signal from the resultant baseband signal,
wherein for any given sequence of information bits represented by the distorted complex-valued baseband signal, the distorted complex-valued baseband signal deviates from a reference baseband signal corresponding to the given sequence of information bits,
wherein for any given sequence of information bits represented by the distorted complex-valued baseband signal:
the given sequence of information bits comprises a first group of information bits and a second group of information bits;
the distorted complex-valued baseband signal comprises a distorted complex-valued signal point that represents the first group of the given sequence of information bits;
the reference baseband signal corresponding to the given sequence of information bits comprises a reference complex-valued signal point that represents the first group of the given sequence of information bits; and
the distorted complex-valued signal point is different from the reference complex-valued signal point, and
wherein the logic that generates the resultant baseband signal by selectively generating either the non-distorted complex-valued baseband signal or the distorted complex-valued baseband signal comprises:
logic that generates a preliminary complex-valued baseband signal that comprises the reference complex-valued signal point; and
logic that modifies the preliminary complex-valued baseband signal to form the distorted complex-valued baseband signal, said logic that modifies comprising logic that adds a predetermined complex-valued distortion amount to the reference complex-valued signal point to generate the distorted complex-valued signal point.

18. The apparatus of claim 17, further comprising logic that obtains the predetermined complex-valued distortion amount from a lookup table.

19. The apparatus of claim 14, further comprising:
logic that generates, for any given sequence of information bits represented by the distorted complex-valued baseband signal, distorted amplitude and phase signals from the resultant baseband signal,
wherein at least one of the distorted amplitude and phase signals has a lower bandwidth than a corresponding bandwidth of reference amplitude and phase signals generated from the reference baseband signal corresponding to the given sequence of information bits.

20. The apparatus of claim 14, wherein said apparatus is implemented in an M-PSK architecture or an M-QAM architecture.

21. The apparatus of claim 14, wherein the logic that generates the radio frequency signal from the resultant baseband signal comprises:
logic that generates polar phase and amplitude signals from the resultant baseband signal; and
logic that generates the radio frequency signal from the polar phase and amplitude signals.

22. An apparatus for generating a radio frequency signal, comprising:
logic that generates a resultant baseband signal by selectively generating either a non-distorted complex-valued baseband signal or a distorted complex-valued baseband signal, wherein selective generation is based upon values of information bits in the sequence of information bits; and
logic that generates the radio frequency signal from the resultant baseband signal,
wherein for any given sequence of information bits represented by the distorted complex-valued baseband signal, the distorted complex-valued baseband signal deviates from a reference baseband signal corresponding to the given sequence of information bits, and
wherein for any given sequence of information bits represented by the distorted complex-valued baseband signal:
the given sequence of information bits comprises a first group of information bits and a second group of information bits;
the distorted complex-valued baseband signal comprises:
a first complex-valued signal point that represents the first group of the given sequence of information bits;
a second complex-valued signal point that represents the second group of the given sequence of information bits; and
one or more distorted trajectory complex-valued signal points in between the first complex-valued signal point and the second complex-valued signal point;
the reference baseband signal corresponding to the given sequence of information bits comprises:
a first reference complex-valued signal point that represents the first group of information bits;
a second reference complex-valued signal point that represents the second group of information bits; and
one or more complex-valued reference trajectory signal points in between the first reference complex-valued signal point and the second reference complex-valued signal point;
the first complex-valued signal point is equal to the first reference complex-valued signal point;
the second complex-valued signal point is equal to the second reference complex-valued signal point; and
at least one of the distorted trajectory complex-valued signal points is different from a corresponding one of the reference trajectory complex-valued signal points.

23. The apparatus of claim 22, wherein the at least one of the distorted trajectory complex-valued signal points differs from the corresponding one of the reference trajectory complex-valued signal points by a predetermined complex-valued distortion amount.

24. The apparatus of claim 22, wherein the logic that generates the resultant baseband signal by selectively generating either the non-distorted complex-valued baseband signal or the distorted complex-valued baseband signal comprises logic that selects a distorted trajectory comprising the at least one of the distorted trajectory complex-valued signal points from a lookup table.

25. The apparatus of claim 22, wherein the logic that generates the distorted complex-valued baseband signal comprises:
logic that generates a preliminary complex-valued baseband signal that comprises the first reference complex-valued signal point, the second reference complex-valued signal point, and at least one non-distorted trajectory complex-valued signal point; and
logic that modifies the preliminary complex-valued baseband signal, said logic that modifies comprising logic that adds a predetermined complex-valued distortion amount to the at least one non-distorted trajectory complex-valued signal point to generate said at least one distorted trajectory complex-valued signal point.

26. The apparatus of claim 25, further comprising logic that obtains the predetermined complex-valued distortion amount from a lookup table.

* * * * *